US011146397B2

(12) United States Patent
Martin et al.

(10) Patent No.: US 11,146,397 B2
(45) Date of Patent: Oct. 12, 2021

(54) ENCODING ABELIAN VARIETY-BASED CIPHERTEXT WITH METADATA

(71) Applicant: EntIT Software LLC, Sunnyvale, CA (US)

(72) Inventors: Luther Martin, Sunnyvale, CA (US); Timothy Roake, Sunnyvale, CA (US); Cheryl He, Sunnyvale, CA (US)

(73) Assignee: Micro Focus LLC, Santa Clara, CA (US)

( * ) Notice: Subject to any disclaimer, the term of this patent is extended or adjusted under 35 U.S.C. 154(b) by 576 days.

(21) Appl. No.: 15/800,008

(22) Filed: Oct. 31, 2017

(65) Prior Publication Data

US 2019/0132129 A1   May 2, 2019

(51) Int. Cl.
| | | |
|---|---|---|
| *H04L 9/30* | (2006.01) |
| *H04L 9/32* | (2006.01) |
| *H04L 9/14* | (2006.01) |
| *H04L 9/06* | (2006.01) |

(52) U.S. Cl.
CPC .......... *H04L 9/3066* (2013.01); *H04L 9/0618* (2013.01); *H04L 9/14* (2013.01); *H04L 9/3263* (2013.01)

(58) Field of Classification Search
CPC ....... H04L 9/3066; H04L 9/0618; H04L 9/14; H04L 9/3263
USPC .......................................................... 380/30
See application file for complete search history.

(56) References Cited

U.S. PATENT DOCUMENTS

| | | | | | |
|---|---|---|---|---|---|
| 5,577,124 | A * | 11/1996 | Anshel | .................... | G06F 7/582 380/285 |
| 6,141,420 | A * | 10/2000 | Vanstone | ................ | G06F 7/725 380/28 |
| 6,243,467 | B1* | 6/2001 | Reiter | ..................... | G06F 7/725 380/30 |
| 6,307,935 | B1* | 10/2001 | Crandall | ................. | G06F 7/725 380/28 |
| 6,480,606 | B1* | 11/2002 | Kurumatani | ........... | G06F 7/725 380/30 |
| 6,490,352 | B1* | 12/2002 | Schroeppel | ........... | H04L 9/3066 380/279 |
| 6,876,745 | B1* | 4/2005 | Kurumatani | ........... | G06F 7/725 380/28 |
| 6,947,557 | B1* | 9/2005 | Megiddo | ............... | H04L 9/0833 380/30 |
| 6,959,382 | B1* | 10/2005 | Kinnis | .................. | G06F 21/602 713/168 |
| 7,162,033 | B1* | 1/2007 | Coron | ..................... | G06F 7/725 380/29 |

(Continued)

FOREIGN PATENT DOCUMENTS

CN         106936770 A  *  7/2017

OTHER PUBLICATIONS

Mihir Bellare, Message-Recovery Attacks on Feistel-Based Format Preserving Encryption, CCS'16, Vienna, Austria, Oct. 24-28, 2016, 24 pages; http://dx.doi.org/10.1145/2976749.2978390.

(Continued)

*Primary Examiner* — Shahriar Zarrineh

(57) ABSTRACT

A technique includes encrypting plaintext to provide a set of projective coordinates that represents a point of an abelian variety curve and represents ciphertext. The technique includes encoding the projective coordinates with metadata, which is associated with the ciphertext.

20 Claims, 4 Drawing Sheets

(56) References Cited

U.S. PATENT DOCUMENTS

| | | | | |
|---|---|---|---|---|
| 7,200,225 B1* | 4/2007 | Schroeppel | G06F 7/725 | 380/277 |
| 7,499,544 B2* | 3/2009 | Jao | G06F 7/725 | 380/30 |
| 8,078,869 B2* | 12/2011 | Adams | G06F 21/71 | 713/166 |
| 8,358,779 B1* | 1/2013 | Sun | G06F 7/725 | 380/28 |
| 8,369,517 B2* | 2/2013 | Venelli | G06F 7/725 | 380/30 |
| 8,566,247 B1* | 10/2013 | Nagel | H04L 63/061 | 705/59 |
| 8,619,977 B2* | 12/2013 | Douguet | G06F 7/725 | 380/28 |
| 8,731,187 B2* | 5/2014 | Lauter | H04L 9/3066 | 380/28 |
| 8,855,317 B2* | 10/2014 | Rong | H04L 9/0836 | 380/278 |
| 8,862,879 B2* | 10/2014 | Lerner | H04L 9/3218 | 713/168 |
| 9,137,025 B2* | 9/2015 | Lambert | G06F 21/81 | |
| 9,596,263 B1 | 3/2017 | Brooker et al. | | |
| 9,660,978 B1* | 5/2017 | Truskovsky | H04L 9/006 | |
| 10,263,997 B2* | 4/2019 | Roth | H04L 63/123 | |
| 10,374,809 B1* | 8/2019 | Dasarakothapalli | H04L 9/3268 | |
| 2002/0051545 A1* | 5/2002 | Ogilvie | H04L 9/00 | 380/280 |
| 2002/0099663 A1* | 7/2002 | Yoshino | G06F 21/10 | 705/65 |
| 2002/0108041 A1* | 8/2002 | Watanabe | H04L 9/3252 | 713/175 |
| 2002/0129242 A1* | 9/2002 | Abbott | H04L 9/0894 | 713/157 |
| 2002/0178371 A1* | 11/2002 | Kaminaga | G06F 7/725 | 713/189 |
| 2003/0081785 A1* | 5/2003 | Boneh | H04L 9/0847 | 380/277 |
| 2003/0084292 A1* | 5/2003 | Pierce | H04L 63/0823 | 713/168 |
| 2003/0179885 A1* | 9/2003 | Gentry | H04L 9/3252 | 380/277 |
| 2003/0189731 A1* | 10/2003 | Chang | G06K 9/00 | 358/3.28 |
| 2004/0034771 A1* | 2/2004 | Edgett | G06Q 20/14 | 713/168 |
| 2004/0247114 A1* | 12/2004 | Joye | G06F 7/725 | 380/28 |
| 2005/0094806 A1* | 5/2005 | Jao | G06F 7/725 | 380/30 |
| 2005/0267926 A1* | 12/2005 | Al-Khoraidly | G06F 7/724 | 708/492 |
| 2006/0015754 A1* | 1/2006 | Drehmel | G06F 21/72 | 713/193 |
| 2006/0056619 A1* | 3/2006 | Billet | G06F 7/725 | 380/28 |
| 2006/0093137 A1* | 5/2006 | Izu | G06F 7/725 | 380/30 |
| 2006/0104447 A1* | 5/2006 | Lauter | H04L 9/3013 | 380/258 |
| 2006/0120528 A1* | 6/2006 | Weng | G06F 7/725 | 380/255 |
| 2007/0121933 A1* | 5/2007 | Futa | H04L 9/3066 | 380/1 |
| 2007/0127721 A1* | 6/2007 | Atallah | H04L 9/088 | 380/277 |
| 2007/0248224 A1* | 10/2007 | Buskey | H04L 9/3271 | 380/30 |
| 2008/0049937 A1* | 2/2008 | Pauker | H04L 63/0442 | 380/270 |
| 2008/0084997 A1* | 4/2008 | Lauter | G06F 7/724 | 380/30 |
| 2008/0260143 A1* | 10/2008 | Ibrahim | G06F 7/725 | 380/28 |
| 2008/0288788 A1* | 11/2008 | Krig | G06F 21/10 | 713/193 |
| 2009/0034720 A1* | 2/2009 | Baek | H04L 9/3066 | 380/30 |
| 2009/0144557 A1* | 6/2009 | Sutton | H04L 9/088 | 713/189 |
| 2009/0180611 A1* | 7/2009 | Douguet | G06F 7/725 | 380/30 |
| 2009/0185677 A1* | 7/2009 | Bugbee | H04L 9/0841 | 380/28 |
| 2010/0040225 A1* | 2/2010 | Venelli | H04L 9/004 | 380/28 |
| 2010/0195821 A1* | 8/2010 | Fischer | G06F 7/725 | 380/28 |
| 2010/0215174 A1* | 8/2010 | Orlando | G06F 7/725 | 380/28 |
| 2010/0223186 A1* | 9/2010 | Hogan | G07F 7/08 | 705/71 |
| 2010/0310066 A1* | 12/2010 | Joye | G06F 7/725 | 380/28 |
| 2010/0322422 A1* | 12/2010 | Al-Gahtani | G06F 7/725 | 380/255 |
| 2011/0058675 A1* | 3/2011 | Brueck | H04N 21/8355 | 380/277 |
| 2011/0170684 A1* | 7/2011 | Lauter | H04L 9/3073 | 380/28 |
| 2012/0008780 A1* | 1/2012 | Al-Somani | G06F 7/725 | 380/255 |
| 2012/0023329 A1* | 1/2012 | Yamamoto | H04L 9/0844 | 713/158 |
| 2012/0166807 A1* | 6/2012 | Shear | G06F 21/51 | 713/176 |
| 2012/0213361 A1* | 8/2012 | Lim | H04L 9/3066 | 380/44 |
| 2012/0237030 A1* | 9/2012 | Ghouti | H04L 9/3066 | 380/255 |
| 2012/0254997 A1* | 10/2012 | Norrman | H04W 12/04031 | 726/22 |
| 2012/0297189 A1* | 11/2012 | Hayton | H04L 9/0822 | 713/165 |
| 2013/0081143 A1* | 3/2013 | Hayashi | G06F 21/10 | 726/26 |
| 2013/0121487 A1* | 5/2013 | Lorberbaum | H04L 9/0861 | 380/44 |
| 2013/0202104 A1* | 8/2013 | Ghouti | H04L 9/3013 | 380/28 |
| 2013/0326602 A1* | 12/2013 | Chen | H04L 9/3255 | 726/6 |
| 2014/0064491 A1* | 3/2014 | Ghouti | H04L 9/3013 | 380/282 |
| 2014/0105381 A1* | 4/2014 | Al-Somani | H04L 9/3066 | 380/28 |
| 2014/0129824 A1* | 5/2014 | Paris | H04L 63/061 | 713/150 |
| 2014/0380054 A1* | 12/2014 | Roth | H04L 63/0435 | 713/171 |
| 2015/0318865 A1* | 11/2015 | Rotge | H03M 7/30 | 708/520 |
| 2015/0379286 A1* | 12/2015 | Nordback | G06F 21/6209 | 713/165 |
| 2016/0149703 A1* | 5/2016 | Al-Somani | H04L 9/3066 | 380/28 |
| 2016/0218860 A1* | 7/2016 | Murray | H04L 9/0618 | |
| 2016/0241389 A1* | 8/2016 | Le Saint | H04L 9/14 | |
| 2016/0328543 A1* | 11/2016 | Hoogerbrugge | G06F 21/14 | |
| 2016/0352518 A1* | 12/2016 | Ford | H04L 9/0825 | |
| 2017/0006392 A1* | 1/2017 | Pedersen | H04R 25/70 | |
| 2017/0063528 A1* | 3/2017 | Seo | H04L 9/0618 | |
| 2017/0063853 A1* | 3/2017 | Lim | H04L 9/0861 | |
| 2017/0083716 A1* | 3/2017 | Sun | H04L 9/14 | |
| 2017/0126642 A1 | 5/2017 | Basin et al. | | |
| 2017/0201384 A1* | 7/2017 | Ignatchenko | H04L 9/0816 | |
| 2018/0034786 A1* | 2/2018 | Srinivasan | H04L 9/14 | |
| 2018/0063105 A1* | 3/2018 | Poon | H04L 9/14 | |

(56) References Cited

U.S. PATENT DOCUMENTS

| | | | |
|---|---|---|---|
| 2018/0083933 A1* | 3/2018 | Mullen | H04L 63/061 |
| 2018/0139041 A1* | 5/2018 | Choi | H04L 9/14 |
| 2018/0176017 A1* | 6/2018 | Rodriguez | H04L 63/0861 |
| 2018/0254893 A1* | 9/2018 | Saxena | G06F 21/6254 |
| 2018/0302400 A1* | 10/2018 | Covdy | H04L 63/0853 |
| 2018/0330079 A1* | 11/2018 | Gray | H04L 9/3247 |
| 2018/0359227 A1* | 12/2018 | Trantham | H04L 63/0457 |
| 2018/0375663 A1* | 12/2018 | Le Saint | H04L 9/3247 |
| 2019/0005262 A1* | 1/2019 | Surla | H04L 9/0894 |
| 2019/0034643 A1* | 1/2019 | Kludy | H04W 12/0608 |
| 2019/0087587 A1* | 3/2019 | Li | G11C 7/24 |
| 2019/0132129 A1* | 5/2019 | Martin | H04L 9/3066 |
| 2020/0259648 A1* | 8/2020 | Koziel | H04L 9/0838 |

OTHER PUBLICATIONS

Tragos,Elias; "Securing the Internet of Things—Security and Privacy in a Hyperconnected World"; ResearchGate, Bulding the Hyperconnected Society; published before Apr. 7, 2016, 32 pp.

* cited by examiner

ENCODING ABELIAN VARIETY-BASED CIPHERTEXT WITH METADATA

BACKGROUND

Data may be encrypted for many different reasons, such as, for example, for purposes of securing communications, protecting sensitive data (data representing social security numbers, salaries, account information, and so forth), and so forth. One way to encrypt and decrypt data is through public key cryptography, which uses a pair of keys: a public key, which, as the name implies, is widely disseminated; and a private keys, which is known to the owner(s) of the data. One type of public key cryptography system is Elliptic Curve Cryptography (ECC), which is based on the algebraic structure of elliptic curves over finite fields.

DETAILED DESCRIPTION

Figure 1:
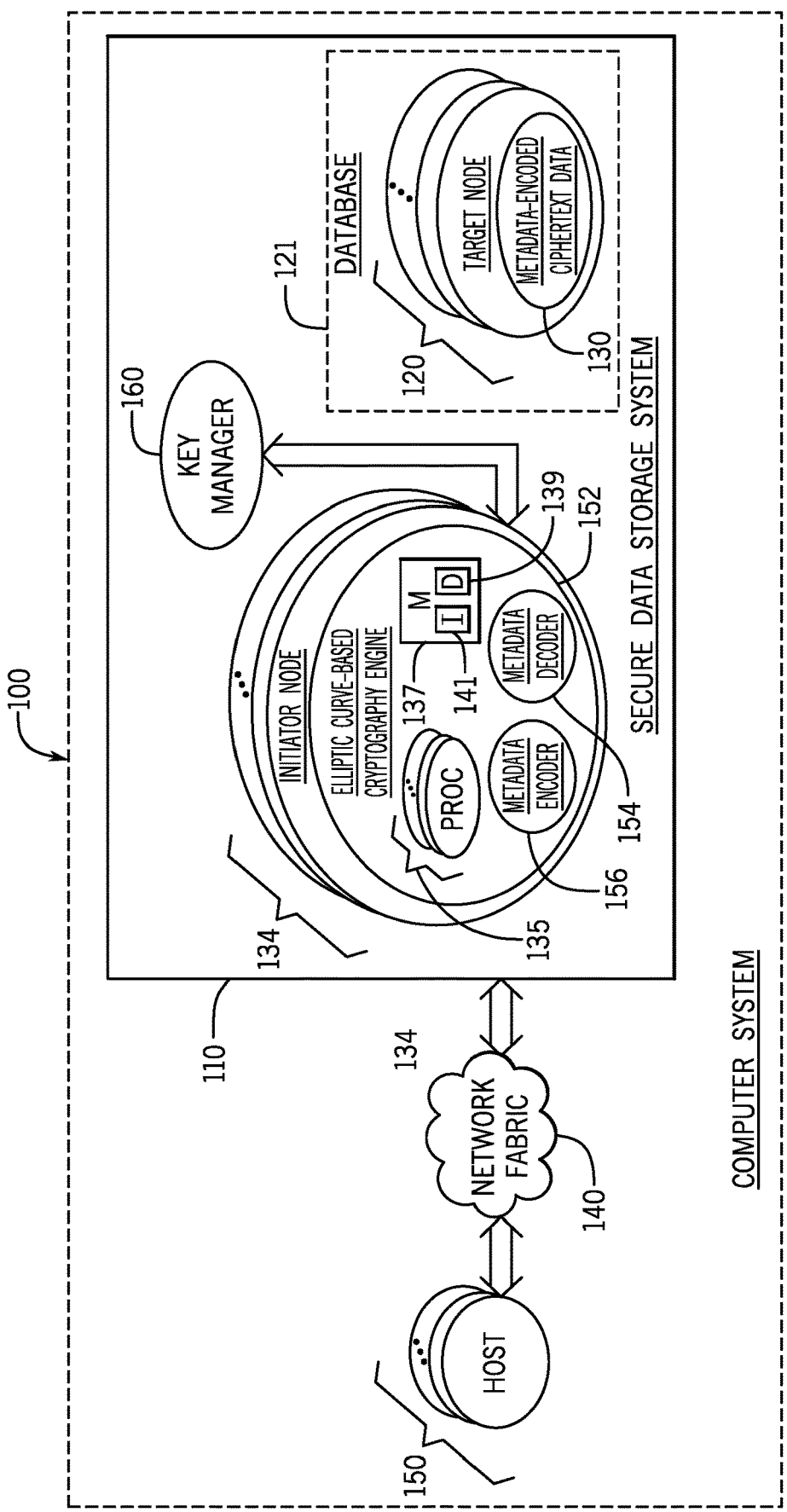
FIG. 1 is a schematic diagram of a computer system according to an example implementation.

Elliptic curve cryptography is based on the algebraic structure of elliptic curves over finite fields. In general, an elliptic curve is a plane curve, which consists of the points that satisfy the following equation:

$$y^2 + xy = x^3 + ax^2 + b, \qquad \text{Eq. 1}$$

excluding cusps and self-intersections. In Eq. 1, the Cartesian coordinates (x,y) represent a point of the elliptic curve; and "a" and "b" are coefficients. The elliptic curve has a point at infinity. In this manner, the point at infinity acts like the value zero when performing calculations on the elliptic curve, so that if "O" represents the point at infinity, then P+O=P for all points on the elliptic curve, similar to the relationship of x+0=x for real numbers.

Elliptic curve calculations may involve modular inversions, which may be relatively expensive (from the standpoint of computing resources). For purposes of incorporating the point at infinity O and avoiding such expensive modular inversions, the points on an elliptic curve may alternatively be represented by projective coordinates. In this representation, instead of representing a point on the elliptic curve as a pair of Cartesian coordinates (x,y), three projective coordinates are instead used, such as, for example, coordinates (X,Y,Z). In this representation, the non-projective coordinates (x,y) coordinates are related to the projective coordinates (X,Y,Z) as follows:

$$x = \frac{x}{z}, \text{ and} \qquad \text{Eq. 2}$$

$$y = \frac{x}{z}. \qquad \text{Eq. 3}$$

It is noted that the relationship between the non-projective and projective points of the elliptic curve may be represented in other manners. For example, the relationship may be a nonlinear relationship ($x=X/Z^3$ and $y=Y/Z^3$, for example).

Using the projective coordinate representation of the points of the elliptic curve, the point at infinity O may be represented as Z=0, with the division by zero in x=X/Z or y=Y/Z indicating the point at infinity.

Thus, with elliptic curve cryptography (ECC), ciphertext may be represented as projective coordinates of an elliptic curve. It is noted that the elliptic curve cryptography is one example of abelian variety-based cryptography, or cryptography that is based on the algebraic structure of an abelian variety curve. As another example, abelian variety-based cryptography may be based on the algebraic structure of a hyperelliptic curve.

In accordance with example implementations that are described herein, metadata may be encoded into projective coordinates that represent abelian variety-based ciphertext. In this context, "abelian variety-based ciphertext" refers to data that has been encrypted based on the algebraic structure of an abelian variety curve. Moreover, "metadata" refers to data that represents information about other data (here, the ciphtertext). In this manner, a set of projective coordinates may represent ciphertext, and the ciphertext may be encoded with metadata, which represents an attribute (key version used to encrypt or decrypt the ciphertext, for example) of the ciphertext.

In accordance with example implementations, the metadata encoding takes advantage of the non-uniqueness of the projective coordinate representation. In this manner, the representation of given point of an abelian variety curve by the projective coordinates (X,Y,Z) coordinates is not unique, as the point of infinity coordinate, Z, may have an arbitrary value. For example, Z may be equal to "1" and using the relationships that are set forth above in Eqs. 1 and 2, the Cartesian coordinates of (1,2) may be represented as (1,2,1). However, other values of Z may be used to represent the coordinates of (1,2). In this manner, based on the relationships of Eqs. 1 and 2, values of Z=2 and Z=3 may be selected to alternatively represent the coordinates of (1,2) as (2,4,2) and (3,6,3). In accordance with example implementations, by varying the value of Z, metadata may be embedded into the projective coordinates.

For example, a key version of "3" may be encoded into the ciphertext. In this manner, for ciphertext represented by the coordinates (1,2), Z may be set equal to "3," and the transformations that are described above in Eqs. 1 and 2 may be applied to generate the metadata-encoded ciphertext of (3,6,3).

As a more specific example, FIG. 1 depicts a computer system 100 in accordance with some implementations. In general, the computer system 100 includes a secure data storage system 110 (a secure storage area network (SAN), for example), which includes initiator nodes 134 and target nodes 120. The target nodes 120 contain physical mass storage devices that collectively form a storage database 121 and store encrypted data (called "ciphertext data" herein) to form a storage database 121. In accordance with example implementations, at least some of the ciphertext data, called "metadata-encoded ciphertext data," may be encoded with metadata that represents one or multiple attributes of the ciphertext data.

In general, hosts 150 may communicate read and write requests to the secure data storage system 110, which cause initiator nodes 134 of the secure data storage system 110 to read and write data to and from the database 121. In this manner, the initiator node 134 is a processing node, which may handle the processing of a request (a read or write request, for example) from a given host 150, identify the target node or nodes 120 associated with the request, and perform the corresponding read and/or writes to the target node(s) 120.

In accordance with example implementations, the hosts 150 communicate with the secure data storage system 110 via network fabric 140. The network fabric 140 may include any type any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Moreover, in accordance with example implementations, the network fabric 140 may include any number of network devices for purposes of facilitating communications between the hosts 150 and the secure data storage system 110. Moreover, a given host 150 may be any electronic device that may interact with the secure data storage system 110, such as, as examples, a desktop computer, a laptop computer, a smartphone, a wearable device (a watch, for example), a client, a server, a thin client, a tablet computer, and so forth.

In accordance with example implementations, the hosts 150 may communicate unencrypted data (called "plaintext data" herein) with the secure data storage system 110. For example, a host 150 may communicate a write request to the secure data system 110, the write request may include plaintext data, and the secure data storage system 110 may encrypt the plaintext data to form ciphertext data that is stored in the storage database 121. As another example, a host 150 may communicate a read request to the secure data system 110, and the secure data storage system 110 may retrieve ciphertext data from the secure data storage system 110 corresponding to the read request. The secure data storage system 110 may then decrypt the ciphertext to form plaintext data, which the secure data storage system 110 communicates to the host 110.

Although example implementations are described herein in which cryptographic operations are performed in the secure data storage system 110, in accordance with further example implementations, the hosts 150 may communicate ciphertext data with the secure data storage system 110; and the hosts 150 may perform cryptographic operations that are similar to the operations that are described below as being performed by the secure data storage system 110. Moreover, in accordance with further example implementations, the hosts 150 and the secure data storage system 110 may both perform cryptographic operations as described herein.

In accordance with example implementations, one or multiple initiator nodes 134 include an elliptic curve-based cryptography engine 152. In general, the cryptography engine 152 encrypts plaintext data (to generate ciphertext data) and decrypts ciphertext data (to generate plaintext data) based on the algebraic structure of elliptic curves over finite fields. In this manner, the elliptic curve-based cryptography engine 152 may encrypt plaintext data that is communicated from the hosts 150 for purposes of providing ciphertext data that is stored in the storage database 121; and the elliptic curve-based cryptography engine 152 may decrypt ciphertext data that is read from the storage database 121 to provide corresponding plaintext data that is communicated to the hosts 150.

In accordance with example implementations, the ciphertext data represents ciphertext and metadata, i.e., the ciphertext data is encoded with the metadata. Moreover, in accordance with example implementations, the ciphertext is the format of projective coordinates (X,Y,Z), which correspond to points of an elliptic curve; and the metadata represents one or multiple attributes that are associated with the ciphertext.

As depicted in FIG. 1, the elliptic curve-based cryptography engine 152 may include a metadata encoder 156, which is constructed to encode elliptic curve-based ciphertext to generate the metadata-encoded ciphertext 130. In this manner, in accordance with some implementations, the metadata encoder 156 may receive elliptic curve-based ciphertext in the form of projective coordinates (X,Y,Z) and modify the X, Y and Z coordinates based on one or more attributes that are associated with the ciphertext to provide projective coordinates (X',Y',Z') that represent both the ciphertext and the metadata. Moreover, in accordance with example implementations, the elliptic function-based cryptography engine 152 may include a metadata decoder 154, which is constructed to process the metadata-encoded ciphertext data 130 to extract the encoded metadata.

As a more specific example, in accordance with some implementations, the metadata may represent a version of a key that is used to encrypt the plaintext data and/or decrypt the ciphertext data. In this manner, the elliptic function-based cryptography engine 152 may encrypt the plaintext data using a key that is provided by a secure key manager 160 of the secure database storage system 110. Moreover, when decrypting data read from the storage database 121, the elliptic function-based cryptography engine 152 may retrieve the appropriate key from the key manager 160 for purposes of decrypting the ciphertext data to produce corresponding plaintext that is provided to the requesting host 150. In accordance with example implementations, the ciphertext data that is read from the database 121 may be associated with a particular version of a key. In other words, although the elliptic function-based cryptography engine 152 may be aware of a particular key to be used to decrypt the ciphertext data read from the database 121, the particular version of the key may vary.

In accordance with example implementations, when the elliptic curve-based cryptography engine 152 encrypts plaintext data to generate corresponding ciphertext data, the metadata encoder 156 encodes the ciphertext data with metadata that represents the version of the key, which is used in the encryption. More specifically, in accordance with some implementations, the infinity point Z may represent a particular key version.

For example, in accordance with some implementations, the elliptic curve-based cryptography engine 152 may first generate ciphertext, i.e., generate projective coordinates, based on Z being "1." The metadata encoder 156, in turn, may transform these projective coordinates by changing Z to represent the key version and changing X and Y based on the new value for "Z." As a more specific example, for a key version "3" and the transformations that are defined by Eqs. 1 and 2, the metadata encoder 156 may convert the ciphertext projective coordinates of (2,1,1) into metadata encoded ciphertext projective coordinates of (6,3,3). It is noted that is also equivalent to the elliptic curve point of (2,1).

The metadata decoder 154, in accordance with example implementations, applies the inverse operation. For the example that is set forth above, the metadata decoder 154 may decode the projective coordinate of (6,3,3) to coordinates that are based on Z being equal to "1." By doing so, the metadata decoder 154 may extract the key version of "3."

In accordance with example implementations, the initiator node 134 is an actual physical machine that is made up of actual hardware and machine executable instructions (or "software"). In general, the initiator node 134 may include, for example, one or multiple processors 135 (one or multiple central processing units (CPUs), one or multiple CPU processing cores, and so forth) and a memory 137. In general, the memory 137 may store data 139 pertaining to preliminary, intermediate, or final results associated with perations of the elliptic function-based cryptography engine 152, as described herein.

The memory 137 may store machine executable instructions 141 (or "software"). In this manner, one or multiple processor(s) 135 may execute the machine executable instructions 141 for purposes of forming one or multiple software components of the initiator node 134, such as, for example, the elliptic function-based cryptography engine 152, the metadata encoder 156, the metadata decoder 154, and so forth.

In accordance with example implementations, the memory 137 is a non-transitory storage medium and may be formed from, as examples, semiconductor storage devices, phase change memory devices, memristors, volatile memory devices, non-volatile memory devices, storage devices associated with other storage technologies, a combination of storage devices selected from one or more of the foregoing storage technologies, and so forth.

Thus, the initiator node 134, in accordance with example implementations, may be software-based, in that one or multiple hardware processors of the node 134 may execute machine executable instructions that are stored in a non-transitory storage medium for purposes of performing the encryption, decryption, metadata encoding and metadata decoding, as described herein. In accordance with further example implementations, one or multiple functions of the initiator node 134 may be formed from a hardware circuit that does not execute machine executable instructions, such as a field programmable gate array (FPGA), an application specific integrated circuit (ASIC), and so forth. For example, in accordance with some implementations, the elliptic function-based cryptography engine 152 may be formed from such a hardware circuit. As other examples, the metadata encoder 156 and/or the metadata decoder 154 may be such hardware circuits.

Although the initiator node 134 is depicted in FIG. 1 as being a single unit, such as a "box," or "rack," in accordance with further example implementations, the initiator node 134 may be formed from multiple machines or machines disposed on multiple racks. Moreover, in accordance with example implementations, the initiator node 134 may include components that are geographically distributed at multiple locations. Thus, many implementations are contemplated, which are within the scope of the appended claims.

Figure 2:
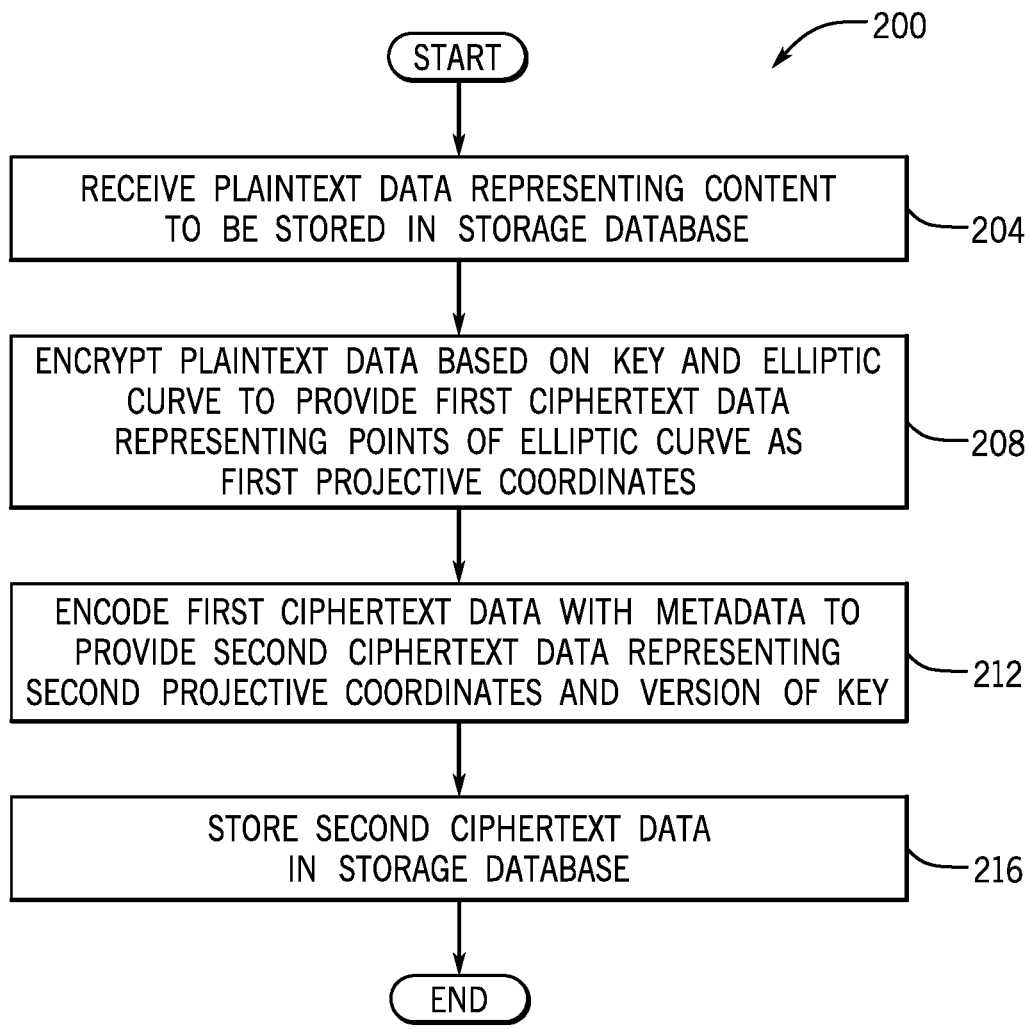
FIG. 2 is a flow diagram depicting a technique to encode metadata into elliptic curve cryptography-based ciphertext to represent a key version associated with the ciphertext according to an example implementation.

Referring to FIG. 2 in conjunction with FIG. 1, in accordance with example implementations, the elliptic function-based cryptography engine 152 may perform a technique 200 for purposes of storing data in the storage database 121 in response to a write request from a host 150. Pursuant to the technique 200, the cryptography engine 152 receives (block 204) plaintext data representing content to be stored in the storage database 121. The cryptography engine 152 encrypts (block 208) the plaintext data based on a key and on an elliptic curve to provide first ciphertext data representing points of the elliptic curve as pairs of first projective coordinates. Pursuant to block 212, the cryptography engine 152 encodes the first ciphertext data with metadata to provide second ciphertext data representing the second projective coordinates and the version of the key. Pursuant to block 216, the cryptography engine 152 may then store the second ciphertext in data in the storage database 121.

Figure 3:
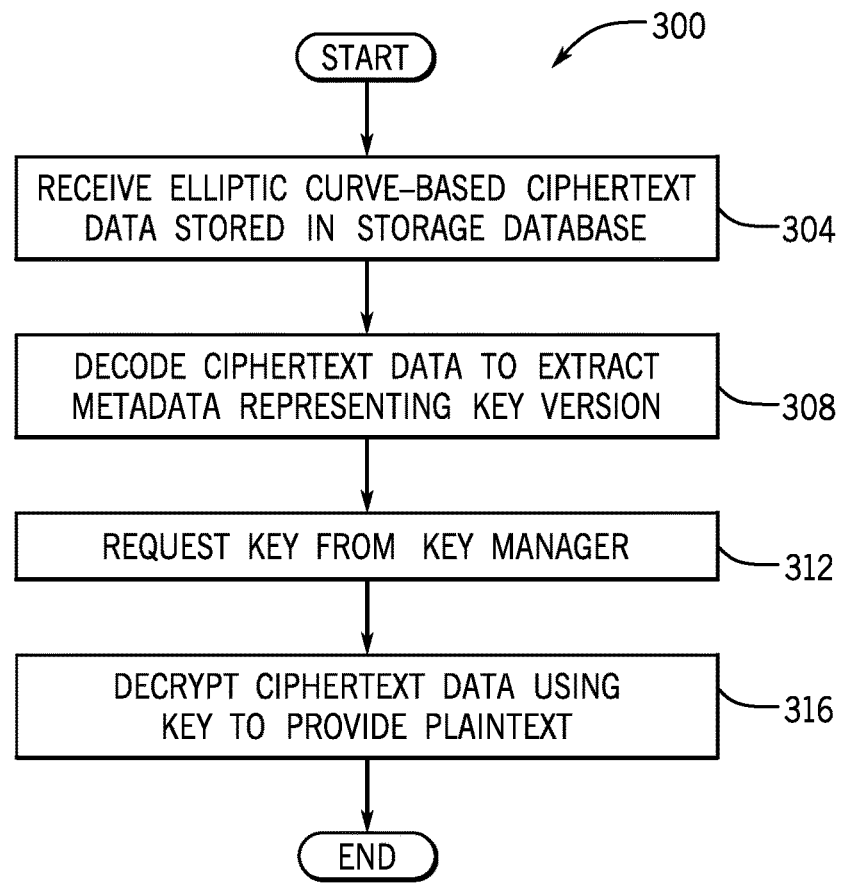
FIG. 3 is a flow diagram depicting a technique to decode key version metadata from elliptic function-based ciphertext according to an example implementation.

Referring to FIG. 3 in conjunction with FIG. 1, in accordance with example implementations, the cryptography engine 152 may perform a technique 300 in response to receiving a read request from a given host 150. Pursuant to the technique 300, the cryptography engine 152 may receive (block 304) elliptic curve-based ciphertext data stored in a storage database 121 and decode (block 308) the ciphertext data to extract metadata representing the key version used in the encryption of the ciphertext. Based on the key version and knowledge of the specific key, the cryptographic engine 152 may then request (block 312) the corresponding key from a key manager 160 and decrypt (block 316) the ciphertext data using the key to provide plaintext data that may be communicated to the host 150.

Although specific examples have been set forth herein describing the metadata representing the version of a key, the metadata may represent one or multiple other attributes associated with the ciphertext, in accordance with further example implementations. For example, in accordance with further example implementations, the metadata may represent an address associated with the key, i.e., may represent a location of the key. More specifically, in accordance with some implementations, the metadata may represent a Uniform Resource Locator (URL) address for retrieving the key. In accordance with further example implementations, the metadata may represent attributes not associated with a particular key. For example, in accordance with some implementations, the metadata may represent a particular policy associated with the encryption or, as another example, a particular policy or version associated with a digital signature.

In accordance with further example implementations, the cryptography may be based on the algebraic structure of an abelian variety curve other than an elliptic curve. For example, in accordance with further implementations, the cryptography may be based on the algebraic structure of a hyperelliptic curve.

Among the advantages of the techniques and systems that are described herein, the metadata decoding/encoding is a format preserving encryption (FPE) that preserves the format of the plaintext data in the ciphertext data. In this manner, FPE refers to a type of encryption in which the format of the plaintext data is the same as the format of the encrypted data. For example, a 16 digit credit card number may be encrypted pursuant to FPE so that the corresponding ciphertext data also has a 16 digit value. The metadata encoding described herein may be performed without consuming any additional storage, as the metadata-encoded ciphertext may have the same data structure and size as ciphertext data that has not be encoded with the metadata. Other and different advantages may be possible using the techniques and systems that are described herein, in accordance with further implementations.

Figure 4:
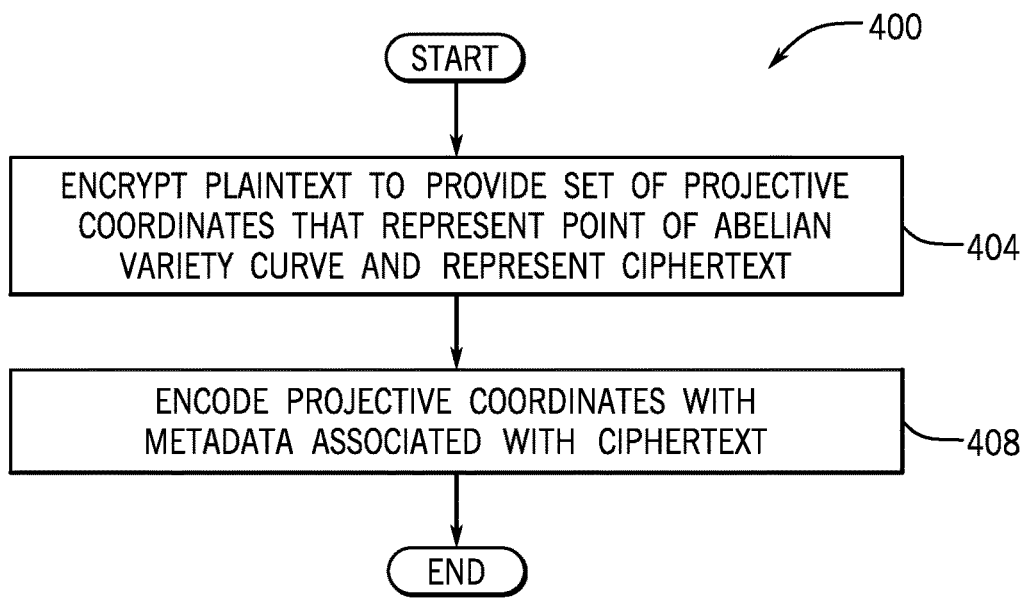
FIG. 4 is a flow diagram depicting a technique to encode abelian variety-based ciphertext with metadata according to an example implementation.

Thus, referring to FIG. 4, in general, in accordance with some implementations, a technique 400 includes encrypting (block 404) plaintext to provide a set of projective coordinates that represents a point of an abelian variety curve and represents ciphertext. The technique 400 includes encoding (block 408) the projective coordinates with metadata, which is associated with the ciphertext.

Figure 5:
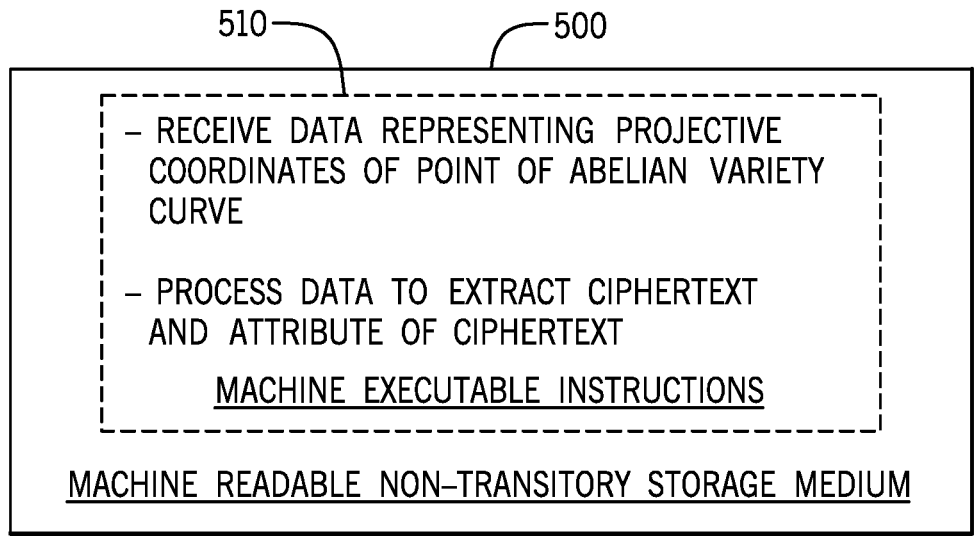
FIG. 5 is an illustration of machine executable instructions stored on a machine readable non-transitory storage medium to extract an attribute of abelian variety-based ciphertext according to an example implementation.
Figure 6:
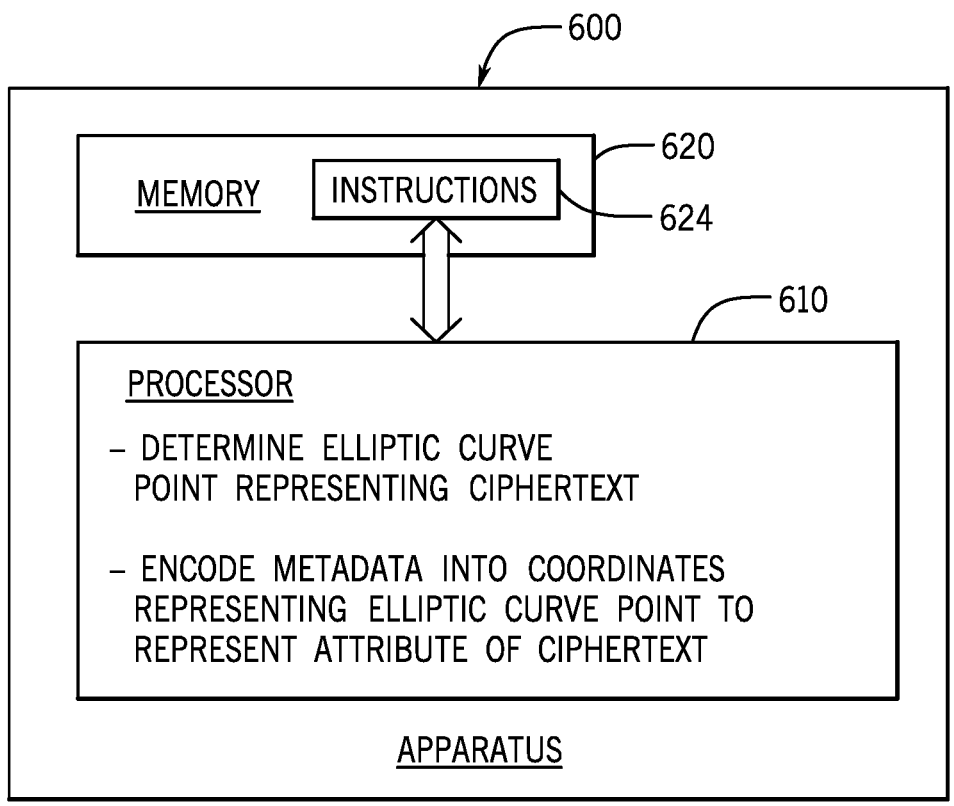
FIG. 6 is an apparatus to encode metadata into elliptic curve-based ciphertext according to an example implementation.

Referring to FIG. 5, in accordance with example implementations, a machine readable non-transitory storage medium 500 stores machine readable instructions 510 that, when executed by a machine, cause the machine to receive data representing projective coordinates of a point of an abelian variety function and process the first data to extract ciphertext and an attribute associated with the ciphertext.

In accordance with example implementations, an apparatus 600 includes a processor 610 and a memory 620 to store instructions 624 that, when executed by the processor 610, cause the processor 610 to determine an elliptic curve point representing ciphertext; and encode metadata into coordinates representing the elliptic curve point to represent an attribute associated with the ciphertext.

While the present disclosure has been described with respect to a limited number of implementations, those skilled in the art, having the benefit of this disclosure, will appreciate numerous modifications and variations therefrom. It is intended that the appended claims cover all such modifications and variations

What is claimed is:

1. A method comprising:
    encrypting plaintext to provide projective coordinates that represent a point of an abelian variety curve and represent ciphertext; and
    encoding the projective coordinates with metadata that represents an attribute of the ciphertext other than the plaintext, wherein encoding the projective coordinates with the metadata comprises encoding the projective coordinates to represent a version of a key associated with the ciphertext.

2. The method of claim 1; wherein encrypting the plaintext comprises encrypting the plaintext based on an elliptic curve function.

3. The method of claim 1, wherein:
    the projective coordinates comprise a first coordinate, a second coordinate and a third coordinate;
    the point of the abelian variety curve has a corresponding first coordinate and a second coordinate;
    the first coordinate of the abelian variety curve is a function of the first coordinate of the projective coordinates and the third coordinate of the projective coordinates;
    the second coordinate of the abelian variety curve is a function of the second coordinate of the projective coordinates and the third coordinate of the projective coordinates; and
    encoding the projective coordinates comprises determining a value of the third coordinate of the projective coordinates based on the attribute of the ciphertext.

4. The method of claim 3, wherein:
    the first coordinate of the abelian variety curve is a quotient of the first coordinate of the projective coordinates divided by the third coordinate of the projective coordinates.

5. The method of claim 3, wherein:
    the first coordinate of the abelian variety curve is a linear function of the first coordinate of the projective coordinates and the third coordinate of the projective coordinates.

6. The method of claim 3, wherein:
    the first coordinate of the abelian variety curve is a nonlinear function of the first coordinate of the projective coordinates and the third coordinate of the projective coordinates.

7. The method of claim 1, wherein
    the abelian variety curve comprises an elliptic curve; and
    encrypting the plaintext comprises encrypting the plaintext based on the elliptic curve.

8. The method of claim 1, wherein
    the abelian variety curve comprises a hyperelliptic curve; and
    encrypting the plaintext comprises encrypting the plaintext based on the hyperelliptic curve.

9. The method of claim 1, wherein encrypting the plaintext comprises performing format preserving encryption.

10. The method of claim 1, wherein:
    encoding the projective coordinates with the metadata further comprises encoding the projective coordinates to represent a version of a digital certificate associated with the ciphertext.

11. The method of claim 1, wherein:
    encoding the projective coordinates with the metadata further comprises encoding the projective coordinates to represent a path to a key associated with the ciphertext.

12. A machine readable non-transitory storage medium to store instructions that, when executed by a machine, cause the machine to:
    receive first data representing projective coordinates of a point of an abelian variety curve;
    process the projective coordinates to extract ciphertext and further extract an attribute of the ciphertext; and
    encode the projective coordinates with metadata that represents an attribute of the ciphertext other than plaintext, wherein the projective coordinates are encoded with the metadata to represent a version of a digital certificate associated with the ciphertext.

13. The machine readable non-transitory storage medium of claim 12, wherein the instructions, when executed by the machine, further cause the machine to:
    transform the projective coordinates into affine coordinates that represent the ciphertext.

14. The machine readable non-transitory storage medium of claim 13, wherein the instructions, when executed by the machine, further cause the machine to:
    divide a first coordinate of the projective coordinates by a second coordinate of the projective coordinates to provide a coordinate of the affine coordinates.

15. The machine readable non-transitory storage medium of claim 12, wherein the instructions, when executed by the machine, further cause the machine to:
    determine the attribute based on a relationship of a first coordinate of the projective coordinates to a second coordinate of the projective coordinates.

16. An apparatus comprising:
    a processor; and
    a memory to store instructions that, when executed by the processor, cause the processor to:
        determine an elliptic curve point representing ciphertext;

encode metadata into coordinates representing the elliptic curve point to represent an attribute of the ciphertext; and encode the coordinates with the metadata to represent a path to a key associated with the ciphertext.

17. The apparatus of claim 16, wherein the instructions, when executed by the processor, further cause the processor to:

encode the coordinates to represent a version of the key associated with the ciphertext.

18. The apparatus of claim 17, wherein the path comprises a Uniform Resource Locator (URL) address.

19. The apparatus of claim 17, wherein:

the ciphertext has a first size; and plaintext corresponding to the ciphertext has a second size that is the same as the first size.

20. The apparatus of claim 16, wherein the instructions, when executed by the processor, further cause the processor to:

encode the coordinates to represent a version of a digital certificate associated with the ciphertext.

\* \* \* \* \*